US012559170B2

(12) United States Patent
Saleme

(10) Patent No.: US 12,559,170 B2
(45) Date of Patent: Feb. 24, 2026

(54) METHOD AND CONTROL UNIT FOR OPERATING A STEERING UNIT FOR A COMMERCIAL VEHICLE

(71) Applicant: KNORR-BREMSE Systeme fuer Nutzfahrzeuge GmbH, Munich (DE)

(72) Inventor: Ahmed Saleme, Wuppertal (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 32 days.

(21) Appl. No.: 18/743,307

(22) Filed: Jun. 14, 2024

(65) Prior Publication Data

US 2024/0416994 A1 Dec. 19, 2024

(30) Foreign Application Priority Data

Jun. 15, 2023 (DE) ..................... 10 2023 115 676.4

(51) Int. Cl.
B62D 6/00 (2006.01)
B62D 5/065 (2006.01)
B62D 5/10 (2006.01)

(52) U.S. Cl.
CPC ............. B62D 6/001 (2013.01); B62D 5/065 (2013.01); B62D 5/10 (2013.01)

(58) Field of Classification Search
CPC .......... B62D 6/001; B62D 6/00; B62D 6/007; B62D 5/065; B62D 5/10; B62D 5/0481; B62D 5/06
USPC ........................................ 701/41, 42, 43, 44
See application file for complete search history.

(56) References Cited

U.S. PATENT DOCUMENTS

| | | | |
|---|---|---|---|
| 10,259,494 B2 * | 4/2019 | Schramm | ............... B62D 6/008 |
| 11,654,956 B2 * | 5/2023 | Frankovics | ......... B60R 16/0233 |
| | | | 701/41 |
| 12,312,027 B1 * | 5/2025 | Schramm | ............... B62D 6/008 |
| 2023/0041535 A1 | 2/2023 | Pasztor et al. | |
| 2024/0208568 A1 * | 6/2024 | Frahm | .................. B62D 5/0463 |

FOREIGN PATENT DOCUMENTS

| | | |
|---|---|---|
| CN | 113928414 A | 1/2022 |
| KR | 10-0897271 B1 | 5/2009 |

OTHER PUBLICATIONS

German-Language Extended European Search Report issued in European Application No. 24178935.3 dated Oct. 31, 2024 with partial English translation (7 pages).

* cited by examiner

*Primary Examiner* — Hai H Huynh
(74) *Attorney, Agent, or Firm* — Crowell & Moring LLP

(57) ABSTRACT

A method for operating a steering unit for a commercial vehicle includes a step of transfer or operation of a regulator unit of the steering unit of the commercial vehicle in an inactive operating mode if it is recognized that a driver is not giving a steering requirement and if a vehicle velocity of the commercial vehicle is lower than a predefined threshold value. The method further includes a step of activation of the regulator unit of the steering unit in an active operating mode if it is recognized that the driver is giving a steering requirement or if a vehicle velocity of the commercial vehicle exceeds the predefined threshold value.

13 Claims, 2 Drawing Sheets

METHOD AND CONTROL UNIT FOR OPERATING A STEERING UNIT FOR A COMMERCIAL VEHICLE

CROSS REFERENCE TO RELATED APPLICATION

This application claims priority under 35 U.S.C. § 119 from German Patent Application No. 10 2023 115676.4, filed Jun. 15, 2023, the entire disclosure of which is herein expressly incorporated by reference.

BACKGROUND AND SUMMARY

The present approach relates to a method and a control unit for operating a steering unit for a commercial vehicle.

In commercial vehicles, a hydraulic steering unit is often used to assist with the steering function, in order to convert steering requirements of the driver into a concrete deflection of the wheels. In most cases, a position regulator or sensor is used, which converts a position or deflection of the steering column into a signal, which is converted into a desired steering moment according to the target steering angle position at the steering column. However, as a result of interference or as a result of noise in general, sensor signals of such a sensor are outputted even when a vehicle is stationary, for example, or in the absence of a steering requirement by the driver, leading to a corresponding regulator unit of the steering unit constantly attempting to compensate for these signal fluctuations caused by interference or noise. This in turn leads to the regulator unit being in constant active operation, so that, on the one hand, the regulator unit itself and, on the other hand, also a hydraulic pump actuated by the regulator unit consume energy unnecessarily. In addition, the hydraulic oil conveyed by the hydraulic pump is heated unnecessarily especially by the wheels, which are not moving and are thus virtually unsteerable, so that on the one hand it becomes worn sooner and on the other hand a malfunction of the steering unit may also possibly occur as a result of overheating.

Against this background, the object of the present approach is to provide an improved method for operating a steering unit for a commercial vehicle, an improved control unit for operating a steering unit for a commercial vehicle, and an improved commercial vehicle.

The approach presented here provides a method for operating a steering unit for a commercial vehicle, wherein the method comprises the following steps:

transfer or operation of a regulator unit of the steering unit of the commercial vehicle in an inactive operating mode when it is recognized that the driver is not giving a steering requirement and when a vehicle velocity of the commercial vehicle is lower than a predefined threshold value; and activation of the regulator unit of the steering unit into an active operating mode when it is recognized that the driver is giving a steering requirement or when a vehicle velocity of the commercial vehicle exceeds the predefined threshold value.

A commercial vehicle can here be understood as being a vehicle for conveying goods or a number of people or for performing work, especially a truck, a bus or, generally, a working machine such as, for example, a tractor or a combine harvester or the like. A steering unit can here be understood as being a unit which can receive manual steering inputs from the driver of the commercial vehicle, for example via a steering wheel, amplify them mechanically, hydraulically or electrically, and output them to a movement unit in order to deflect wheels of the commercial vehicle into a desired steering angle. A regulator unit can here be understood as being a unit which can import input signals in a physical quantity representing the manual steering input of the driver and which can provide as an output signal an actuation signal for the movement unit. For example, the steering input can be made by rotation of the steering wheel, so that the physical quantity can be imported as a rotation angle of the steering wheel or a torque introduced at the steering wheel. The regulator unit can be embodied or implemented as a PID controller, for example.

The approach proposed here is based on the finding that steering regulation for a commercial vehicle is in most cases not required if, on the one hand, the vehicle is stationary or is moving at only a very low speed and, on the other hand, an active steering input by the driver is also not detected. In this case, it can be assumed that signal fluctuations of a signal from a sensor which is to detect the steering input of the driver are caused by noise or by other interference, so that correction of such signal fluctuations is not relevant for driving operation of the commercial vehicle and can thus be omitted.

The approach proposed here is advantageous especially because, on the one hand, an unnecessary energy outlay for steering regulation that is not required can be omitted, and on the other hand the steering unit exhibits lower wear and increased operational reliability.

According to a particular embodiment of the approach proposed here, the regulator unit can be activated in the activation step in a delayed manner and/or with a weighted, in particular temporally weighted, regulator output signal. For example, an output signal of the regulator unit can be weighted with a factor, for example also a temporally variable factor, so that gentle and continuous actuation of the movement element for deflecting the wheels of the commercial vehicle can be achieved. Such an embodiment offers the advantage that it avoids high pressure fluctuations in the hydraulic circuit of the steering unit and thus likewise reduces unnecessary wear of the steering unit.

An embodiment of the approach proposed here in which the regulator output signal is weighted and/or delayed using a linear, quadratic and/or exponential function is particularly advantageous. Such an embodiment offers the advantage of technically simple implementation of the outputting of the smoothed or continuous regulation signal to the determination unit, without fear of an unnecessary time delay in the actuation of the deflection of the wheels.

There is further developed an embodiment of the approach presented here in which, in the transfer or activation step, there is used as the predefined threshold value for the vehicle velocity a value which represents at the maximum a walking speed, in particular a value of not more than 3 or 5 kilometers per hour. Such an embodiment of the approach presented here offers the advantage that the steering unit is kept active also when the commercial vehicle is travelling slowly, so that a steering intervention of the driver can also be implemented promptly when the vehicle is travelling slowly in this way.

An embodiment of the approach proposed here in which the regulator unit that is actuated in the transfer and/or activation step is a PID controller is particularly advantageous. With such an embodiment, quick and precise actuation of the desired deflection angle of the wheels can advantageously be achieved.

According to another embodiment of the approach presented here, the regulator unit can be actuated in the transfer and/or activation step such that a physical quantity regulated by the regulator does not exceed and/or fall below a maximum value. For example, such a regulated physical quantity can be a pressure of a hydraulic fluid of the steering unit or a rotational speed of a pump of the steering unit. Such an embodiment offers the advantage that it avoids too rapid a rise or fall in the pressure of the hydraulic fluid in the steering unit and abrupt steering movements or movements of a steering wheel caused thereby.

Furthermore, it is also possible in the transfer and/or activation step for a regulator unit of a hydraulic steering system to be actuated, in particular for a hydraulic pump of the hydraulic steering system to be actuated by the regulator unit. Such an embodiment offers the advantage that already existing components of the steering unit can often be actuated in a technically simple and advantageous manner in order to achieve the object mentioned above.

According to a further embodiment of the approach presented here, in the step of transferring the regulator unit of the steering unit of the commercial vehicle from the active to the inactive operating mode, the regulator unit can be actuated such that a pressure drop in a hydraulic circuit of the steering unit does not fall below a predefined gradient threshold value, and/or in the step of activating the regulator unit of the steering unit of the commercial vehicle from the inactive to the active operating mode, the regulator unit can be actuated such that a pressure rise in a hydraulic circuit of the steering unit does not exceed a predefined gradient threshold value. A gradient threshold value can be understood as being a parameter which represents a maximum (positive or negative) gradient which is to be exhibited by a pressure in the hydraulic circuit of the steering unit. Such an embodiment offers the advantage that it does not cause any pressure spikes in the hydraulic system of the steering unit and thus minimizes as far as possible wear of the steering unit and a risk due to abrupt movements of components of the steering unit.

Furthermore, according to another embodiment of the approach presented here, the regulator unit of the steering unit can be actuated in the transfer step using a brake signal which represents an activation state of a hand brake or parking brake. Such an embodiment offers the advantage that, when a hand brake or parking brake is activated, the vehicle is not expected to need to perform any steering movements, so that, when the hand brake or parking brake is in such an activated state, the steering unit can also be brought into an inactivated state.

Variants of this method can be implemented, for example, in software or hardware or in a mixed form of software and hardware, for example in a control unit.

The approach presented here further provides a control unit which is configured to perform, actuate or implement the steps of a variant of a method presented here in corresponding devices. The object on which the invention is based can also be achieved quickly and efficiently by this embodiment variant of the invention in the form of a control unit.

To this end, the control unit can have at least one computing unit for processing signals or data, at least one storage unit for storing signals or data, at least one interface with a sensor or an actuator for importing sensor signals from the sensor or for outputting control signals to the actuator, and/or at least one communication interface for importing or outputting data, which are embedded in a communication protocol. The computing unit can be, for example, a signal processor, a microcontroller or the like, wherein the storage unit can be a flash memory or a magnetic storage unit. The communication interface can be configured to import or to output data wirelessly and/or in a wired manner, wherein a communication interface which is able to import or output data in a wired manner can import or output such data, for example, electrically or optically from or into a corresponding data transmission line.

A control unit can here be understood as being an electrical device which processes sensor signals and, in dependence thereon, outputs control and/or data signals. The control unit can have an interface which can be hardware-and/or software-based. In the case of a hardware-based form, the interfaces can be, for example, part of a so-called system ASIC, which includes a very wide variety of functions of the control unit. It is, however, also possible that the interfaces are separate, integrated circuits or consist at least in part of discrete structural elements. In the case of a software-based form, the interfaces can be software modules which are present, for example, on a microcontroller in addition to other software modules.

Also advantageous is a computer program product or computer program having program code which can be stored on a machine-readable carrier or storage medium such as a semiconductor memory, fixed-disc storage or an optical memory and is used to carry out, implement and/or actuate the steps of the method according to one of the embodiments described above, in particular when the program product or program is executed on a computer or an apparatus.

Other objects, advantages and novel features of the present invention will become apparent from the following detailed description of one or more preferred embodiments when considered in conjunction with the accompanying drawings.

Elements which are identical or have a similar action are provided with the same or similar reference signs in the following description, a repeat description being omitted for reasons of clarity.

DETAILED DESCRIPTION OF THE DRAWINGS

Figure 1:
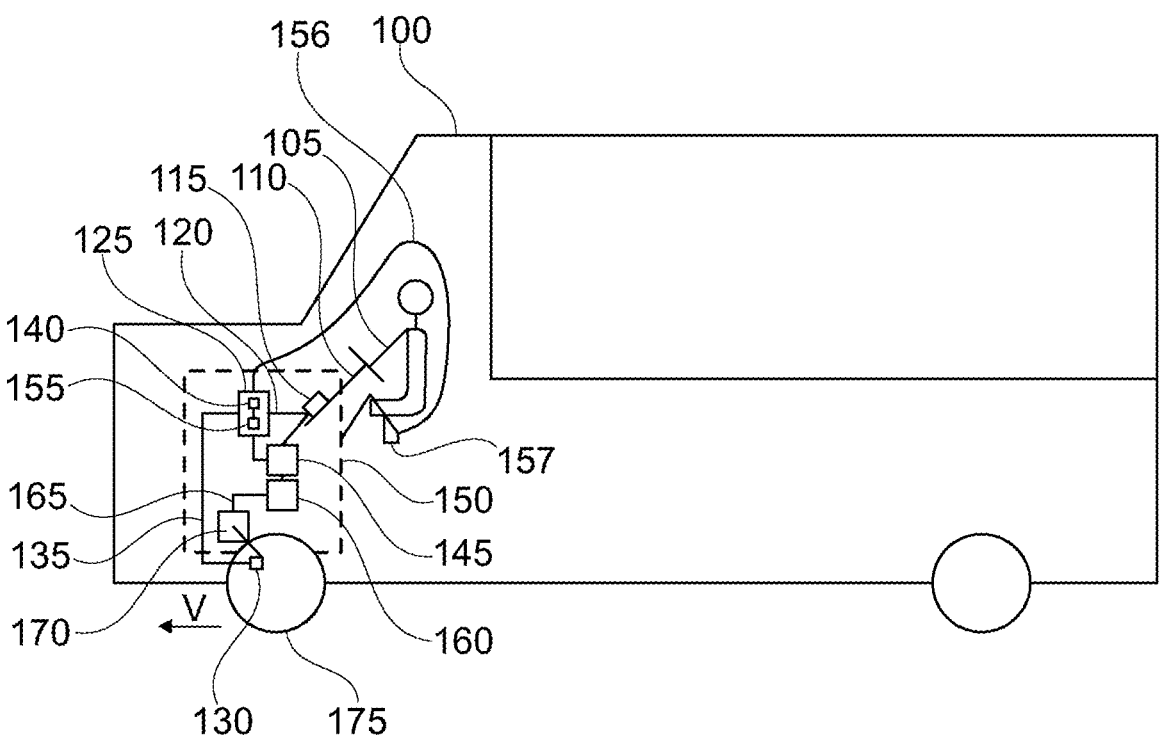
FIG. 1 is a schematic representation of a commercial vehicle.

FIG. 1 shows a schematic representation of a commercial vehicle 100. The commercial vehicle 100 is here controlled, for example, by a driver 105 by means of a steering wheel 110. When the driver 105 rotates the steering wheel 110 and thereby gives a steering requirement, such a rotation or such a torque can be detected by a sensor 115 on the steering column and converted into a corresponding sensor signal 120, which is fed to a control unit 125. A movement signal 135 can further be outputted via a movement sensor 130 which is able to detect a movement of the commercial vehicle 100, the movement signal in turn being imported by the control unit 125. The control unit 125 can then place a regulator unit 145 of a steering unit 150 into an inactive operating mode, for example by means of a transfer unit 140, if it is recognized that the driver 105 is not giving a steering requirement via the steering wheel 110 and at the same time a vehicle velocity v of the vehicle is lower than a predefined threshold value. By means of an activation unit 155 of the control unit 125, the regulator unit 145 of the steering unit 150 can then, for example, be placed into an active state or operating mode if it is recognized that the driver 105 is giving a steering requirement or if a vehicle velocity v of the commercial vehicle 100 exceeds the predefined threshold value. It is also contemplated that a brake signal 156 from a hand brake 157 is taken into consideration in the transfer unit 140 or the activation unit 155 of the control unit 125, as is described in greater detail hereinbelow.

Without loss of generality, the regulator unit 145 can be in the form of a PID controller and can actuate, for example, a hydraulic pump 160 of the steering unit 150 on the basis of the transmitted signal 120. By means of the hydraulic pump 160, pressure in a hydraulic circuit 165, for example, can be controlled, in particular regulated, as a result of which, for example, a movement element 170, which is in the form of, for example, a hydraulic motor, can effect a deflection of wheels 175 of the commercial vehicle 100. In this way, the commercial vehicle 100 can be steered as specified by the driver.

As has briefly been described above, measurement errors or noise, for example, in the sensor signal 120 can lead to the regulator unit 145 in the prior art permanently attempting to compensate for the signal fluctuations of the transmitted signal. This causes, on the one hand, an increased energy consumption by operation of the regulator unit 145 and also, for example, of the hydraulic pump 160 or of the movement element 165, as well as increased wear or impairment of the operability of components of the steering system 150, for example as a result of an unnecessary increase in a pressure or temperature of the hydraulic fluid.

In order to eliminate this problem, the approach presented here proposes a significant improvement. Specifically, it is here assumed that steering of the commercial vehicle is in most cases not required if, firstly, no steering requirement is being made by the driver and, secondly, the vehicle is also immobile or at least has a very low vehicle velocity. In this case, it can be assumed that the signal fluctuations in the sensor signal 120 are caused by interference or by noise and thus active regulation of the steering movement by the regulator unit 145 does not have to be carried out. In this case, the regulator unit 145 can then be placed into the inactive operating mode.

If, however, either a steering requirement is given by the driver 105, for example by rotation of the steering wheel 110, or the vehicle travels more quickly, for example more quickly than a threshold value of three or five kilometres per hour, it can be assumed that active steering of the vehicle is required and thus the regulator unit 145 is to be placed into the active operating mode. In this way, it is possible to react quickly to time-critical steering requirements of the driver 105.

Figure 2:
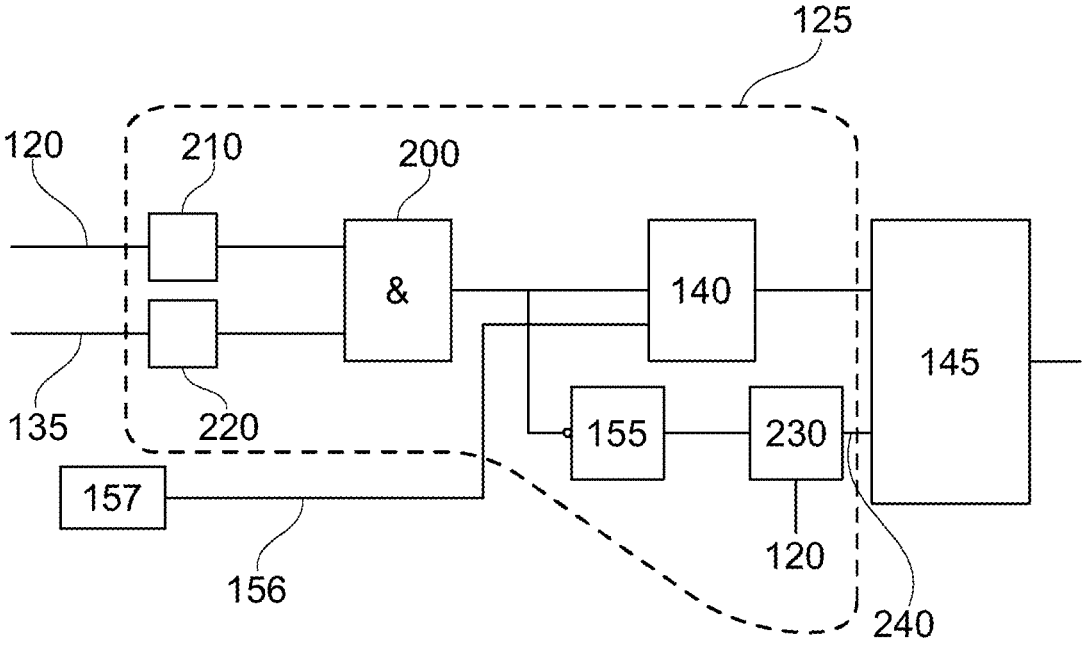
FIG. 2 is a schematic representation of a circuit diagram for implementing the procedure presented here.

FIG. 2 shows a schematic representation of a circuit diagram for implementing the procedure presented here. The control unit 125 here comprises, for example, an AND-logic unit 200 of which the first input is connected to an output of a sensor signal comparator 210 and the second input is connected to an output of a movement signal comparator 220. In the sensor signal comparator 210, it is checked whether the sensor signal 120 is above a predetermined threshold value, which represents, for example, a limit above which a torque actively exerted on the steering wheel by the driver or indicates a specific steering angle through which the steering wheel has been rotated by the driver. The movement signal comparator 220 determines whether the vehicle velocity of the commercial vehicle 100 is greater than or equal to a predetermined threshold value, for example greater than or equal to walking speed, or 3 to 5 kilometres per hour. If both conditions are met, an inactivation signal is transmitted to the transfer unit 140 by the AND-logic unit 200, said transfer unit 140 then being configured to transfer the regulator unit 145 into the inactive state, that is to say that the regulator unit 145 does not perform any regulation. If, however, one of the conditions at the inputs of the AND-logic unit is not met, the activation unit 155 is actuated and then activates, for example, an adjustment unit 230, which performs, for example, a temporal or quantitative delay or weighting of the outputting of a regulator signal 240 which activates the regulator unit 145. The regulator unit 145 can, for example, be enabled in a delayed manner within a predefined time period, or the sensor signal 120 used for regulation can be provided with a weighting that is linear, quadratic or exponential in the time period and this delayed or weighted sensor signal can be used as the input signal of the regulator unit 145.

It is also contemplated that the transfer unit 140 responds to the brake signal 156 of the parking or hand brake 157, so that, for example, the regulator unit 145 is transferred into an inactive state because an activated hand or parking brake is recognized. In this case, it can likewise be assumed that regulation of steering is not required.

In a further exemplary embodiment, deactivation of the regulator unit 145 can also be carried out by the transfer unit 140 by means of a unit which is analogous in terms of function to the adjustment unit 230 but is not shown in FIG. 2 for reasons of clarity, and which likewise performs a delayed or weighted deactivation of the regulator unit 145.

Figure 3:
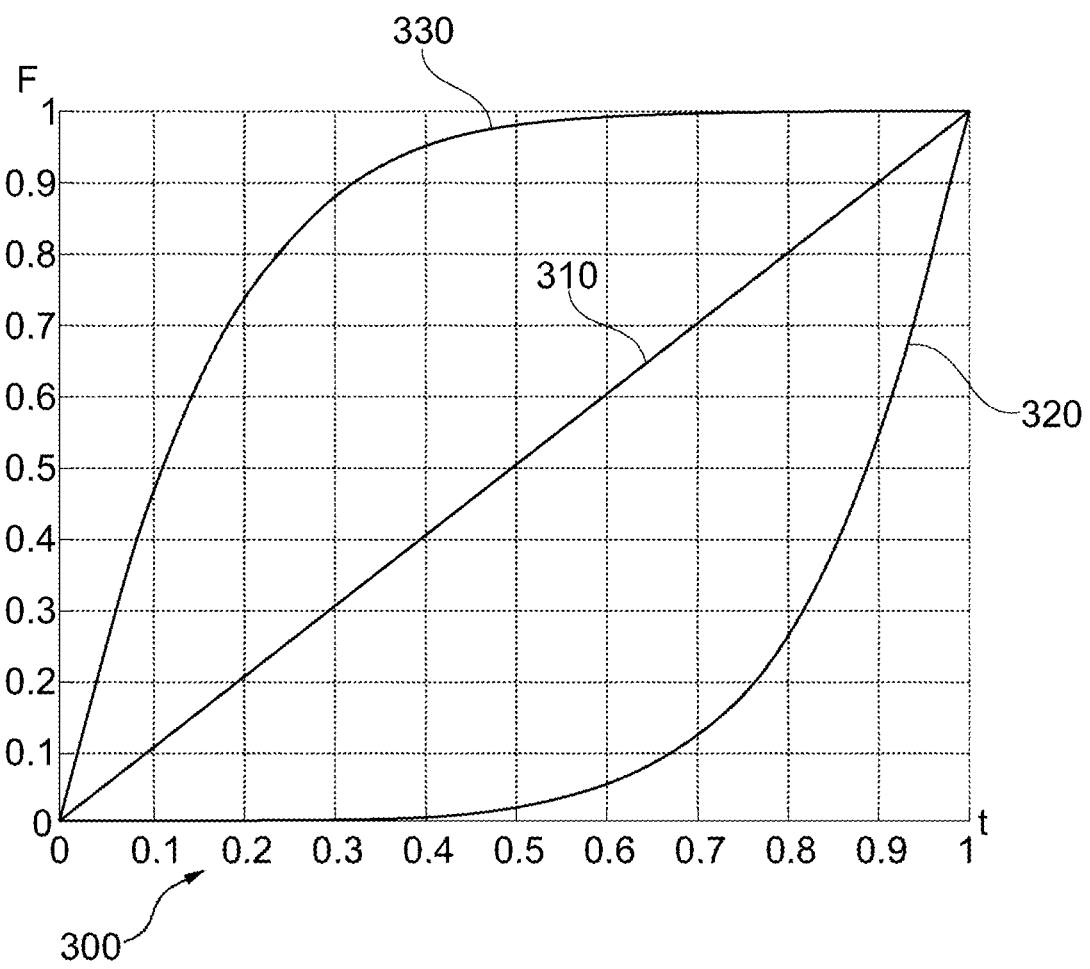
FIG. 3 is a diagram of a schematic procedure for weighting or delaying the activation or deactivation of the regulator unit.

FIG. 3 shows a diagram 300 of a schematic procedure for weighting or delaying the activation or deactivation of the regulator unit 145. The time t is plotted on the abscissa of the diagram 300, while an amplification factor F is shown on the ordinate of the diagram 300. In this diagram 300, a characteristic curve 310 of a linear transition is shown, said characteristic curve representing an amplification or weighting which increases constantly over time, so that a linearly increasing sensor signal 120 is applied to the regulator unit 145 within the normalized time period t. The regulator unit 145 can, however, also be actuated, or the sensor signal 120 can be applied thereto, with an exponential weighting, which is shown by the characteristic curve 320, or a logarithmic weighting, which is shown by the characteristic curve 330. It is, however, also possible for any desired relationship to be used for the delay or weighting, depending on the functional relationship currently desired by a user.

Figure 4:
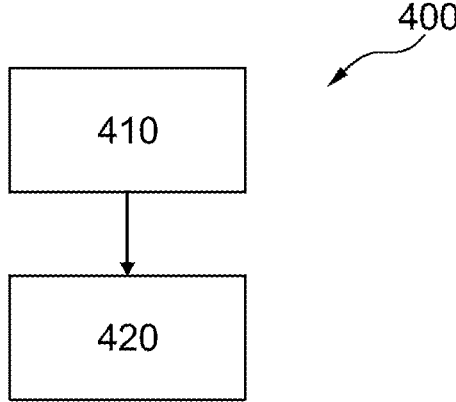
FIG. 4 is a flow diagram of a method for operating a steering unit for a commercial vehicle.

FIG. 4 shows a flow diagram of a method 400 for operating a steering unit for a commercial vehicle. The method 400 comprises a step 410 of transferring or operating a regulator unit of the steering unit of the commercial vehicle in an inactive operating mode if it is recognized that the driver is not giving a steering requirement and if a vehicle velocity of the commercial vehicle is lower than a predefined threshold value. The method 400 further comprises a step 420 of activating the regulator unit of the steering unit into an active operating mode if it is recognized that the driver is giving a steering requirement or if a vehicle velocity of the commercial vehicle exceeds the predefined threshold value.

In summary, it should be noted that, with the approach presented here, the use of a quasi-adaptive regulator with control variable limitation is proposed. The driver torque and the vehicle velocity are taken into consideration as reference points for the function. The steering regulator (or PID controller), for example, is also placed on standby if the driver does not require any torque and the vehicle velocity is low. As soon as one of the two conditions, or both, is no longer met, the regulator changes, for example, from the inactive to the active state. The transition from the active to the inactive state takes place, for example, by a temporal linear function. The transition function can likewise be a quadratic, that is to say parabolic, function or an exponential function, depending on the client's requirements.

As regulator parameters it can be mentioned that the individual regulator parameters each move, for example, between two different limits. The upper limits represent the case in which the regulator function is activated. The lower limits represent the case in which the regulator function is deactivated. An I component limitation can also be provided in the case of a PID controller, that is to say a limitation of the minimum and/or maximum I component can be provided. For example, the I component (integrator) can be limited twice and reset if not required. The first limitation of the I component (that is to say not the I parameter) takes place, for example, indirectly and is characterized by limitation of the maximum and minimum possible/permitted torque at the steering system (taking account of the functions, degradations, etc.). It is thus ensured, for example, that the regulator cannot provide torques which are excessive (not permitted). This measure is a property of the regulation concept.

A further I component limitation can also be carried out, wherein the first limitation can be seen in that the two maximum and minimum permitted torques likewise vary analogously to the PID parameters. The respective lower limit is, for example, zero. The second I component limitation can be carried out directly by limiting the I component of the PID controller with the aid of the time-dependent function.

A PID limitation can also be provided in which, finally, the control variable of the regulator is likewise limited by the time-dependent function used. A regulator with feedforward control can also be used, in which the regulating concept has in addition to the PID controller a feedforward control which ensures that the regulating error declines rapidly. This means that the reaction time, or the response of the system to the driver's wishes, is scarcely impaired by this function because the feedforward control component thus becomes greater. The feedforward control can also be designed proportionally to the driver torque and to the vehicle velocity.

By means of the approach presented here, increased and unnecessary current consumption when stationary is to be avoided as far as possible. By limiting the regulator, no torque demands are made of the motor. By contrast, without the tyre relaxation function a torque is permanently required by the position regulation (the position from the last cycle is maintained) and not by the driver torque (equal to zero).

The approach presented here can in particular have an influence on an oil pressure and a steering angle when stationary. When the steering wheel is released, a pressure equalization takes place in both working chambers. In the middle position, there is no pulsation of the steering angle and of the pressure. An electric motor speed of an electric motor of the hydraulic pump can also be reduced when stationary. Both in the zero position of the steering wheel and in any desired position, active operation of this motor is not required as long as no driver torque is present and the vehicle velocity is low, then no torque is required at the motor.

With the approach presented here, a rapid or uncontrolled pressure drop when the steering is switched off can also be avoided. On ignition change, the bypass valve, for example, also changes into a deenergized state, so that both working chambers are short-circuited. As a result, a pressure equalization takes place in both working chambers. The steering wheel in this case rotates quickly until the pressure in the corresponding working chamber has fallen completely. This causes an uncontrolled (unregulated) rapid steering wheel rotation. A rotational speed is dependent on the pressure and/or possible current recovery. As a consequence, safety problems arise, as a result of which the driver can be injured or which result in damage being caused to the mechanical and electronic components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

100 Commercial vehicle
105 Driver
110 Steering wheel
115 Sensor
120 Sensor signal
125 Control unit
130 Movement sensor
V Vehicle velocity
135 Movement signal
140 Transfer unit
145 Regulator unit
150 Steering unit
155 Activation unit
156 Brake signal
157 Hand brake
160 Hydraulic pump
165 Hydraulic circuit
170 Movement unit
175 Wheel
200 AND-logic unit
210 Sensor signal comparator
220 Movement signal comparator
230 Adjustment unit
240 Regulator signal
300 Diagram
310 Linear characteristic curve
320 Exponential characteristic curve
330 Logarithmic characteristic curve
400 Method for operating a steering unit for a commercial vehicle
410 Transfer step
420 Activation step

What is claimed is:

1. A method for operating a hydraulic steering unit for a commercial vehicle, wherein the method comprises the steps of:

transferring or operating a regulator unit of the hydraulic steering unit of the commercial vehicle in an inactive operating mode when determining that a driver is not giving a steering requirement and when a vehicle velocity of the commercial vehicle is lower than a predefined threshold value; and activating the regulator unit of the hydraulic steering unit into an active operating mode when determining that the driver is giving a steering requirement or when a vehicle velocity of the commercial vehicle exceeds the predefined threshold value, wherein activating the regulator unit of the hydraulic steering unit comprises actuating a hydraulic pump of the hydraulic steering unit.

2. The method according to claim 1, wherein the regulator unit is activated in the activating step in a delayed manner and/or with a weighted regulator signal.

3. The method according to claim 2, wherein the regulator signal is weighted and/or delayed in the activating step using a linear, quadratic and/or exponential function.

4. The method according to claim 2, wherein the weighting is a temporal weighting.

5. The method according to claim 1, wherein in the transferring step or the activating step, using, as the predefined threshold value for the vehicle velocity, a value which represents at maximum a walking speed.

6. The method according to claim 5, wherein the value is not more than 3 or 5 kilometers per hour.

7. The method according to claim 1, wherein the regulator unit in the transferring step and the activating step is a PID controller.

8. The method according to claim 1, wherein the regulator unit is actuated in the transferring step and/or the activating step such that a physical quantity regulated by the regulator unit does not exceed and/or fall below a maximum value.

9. The method according to claim 1, wherein in the step of transferring the regulator unit of the hydraulic steering unit of the commercial vehicle from the active to the inactive operating mode, the regulator unit is actuated such that a pressure drop in a hydraulic circuit of the hydraulic steering unit does not fall below a predefined gradient threshold value, and/or in the step of activating the regulator unit of the hydraulic steering unit of the commercial vehicle from the inactive to the active operating mode, the hydraulic regulator unit is actuated such that a pressure rise in a hydraulic circuit of the steering unit does not exceed a predefined gradient threshold value.

10. The method according to claim 1, wherein the regulator unit of the hydraulic steering unit is actuated in the transferring step using a brake signal which represents an activated state of a hand brake or parking brake.

11. A control unit comprising one or more processors operatively configured to:
transfer or operate a regulator unit of a hydraulic steering unit of a commercial vehicle in an inactive operating mode when determining that a driver is not giving a steering requirement and when a vehicle velocity of the commercial vehicle is lower than a predefined threshold value; and
activate the regulator unit of the hydraulic steering unit into an active operating mode when determining that the driver is giving a steering requirement or when a vehicle velocity of the commercial vehicle exceeds the predefined threshold value, wherein activating the regulator unit of the hydraulic steering unit comprises actuating a hydraulic pump of the hydraulic steering unit.

12. A commercial vehicle comprising a control unit according to claim 11.

13. A computer product comprising a non-transitory computer readable medium having stored thereon program code which, when executed on one or more processors, causes the acts of:
transferring or operating a regulator unit of a hydraulic steering unit of a commercial vehicle in an inactive operating mode when determining that a driver is not giving a steering requirement and when a vehicle velocity of the commercial vehicle is lower than a predefined threshold value; and
activating the regulator unit of the hydraulic steering unit into an active operating mode when determining that the driver is giving a steering requirement or when a vehicle velocity of the commercial vehicle exceeds the predefined threshold value, wherein activating the regulator unit of the hydraulic steering unit comprises actuating a hydraulic pump of the hydraulic steering unit.

* * * * *